WILLIAM K. MADDOX,
INVENTOR.

BY Lyon & Lyon
ATTORNEYS.

United States Patent Office 3,191,617
Patented June 29, 1965

3,191,617
PUMP VALVE
William K. Maddox, Duncan, Okla., assignor to Halliburton Company, Duncan, Okla., a corporation of Delaware
Filed Nov. 29, 1962, Ser. No. 240,816
1 Claim. (Cl. 137—516.29)

This invention relates to check valves and more particularly relates to check valves adpated for use in heavy duty pumps, such as those used in oil fields for forcing cement slurry, mud or other abrasive fluid into a well under high pressure.

In United States Patent No. 2,983,281, issued May 9, 1961, to F. A. Bynum, there is disclosed a check valve which is particularly useful in the construction of oil field pumps. The valve disclosed is constructed in such a manner that both the valve seat and valve body may be easily and quickly replaced in the event of excessive wear. The valve body is provided with a beveled outer rim to conform to the shape of the valve seat and, in addition, is provided with a gasket which also conforms to the shape of the valve seat and which is secured to the valve body by a suitable flanged washer and clamp.

While this valve is satisfactory in many instances, it has been found that very high fluid velocities or high closing speeds may, in some cases, strip the gasket from the valve body. According to the present invention, a gasket or insert is provided which cooperates with a modified valve body in such a manner that it cannot be stripped from the valve regardless of the closing speed, fluid velocity, or the like. For this purpose, a special groove is machined into the valve body and a matching ridge is molded on the insert. Once the insert has been forced into place, it cannot be stripped from the valve.

It is therefore an object of the present invention to provide an improved check valve for use with a heavy-duty pump.

It is also an object of the present invention to provide a check valve having a sealing insert which cannot be stripped from the valve.

It is another object of the present invention to provide an improved valve body for a check valve adapted for use with heavy-duty pumps.

Figure 1:
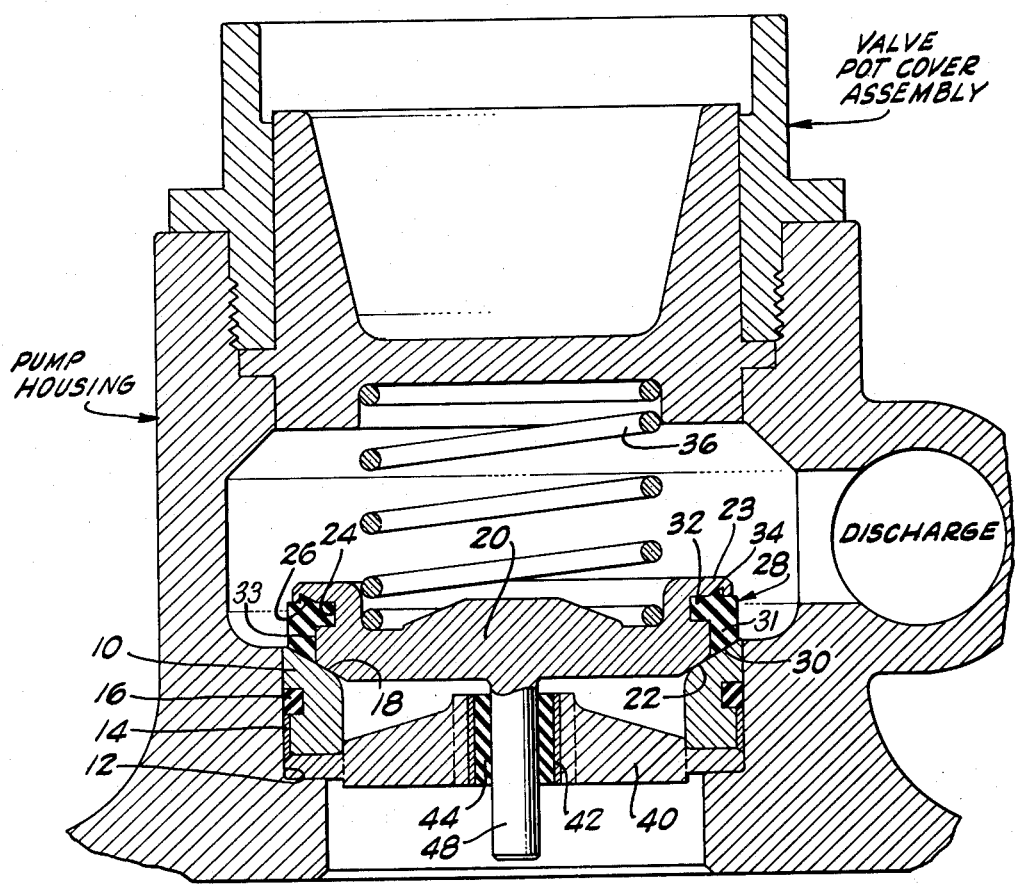
Figure 2:
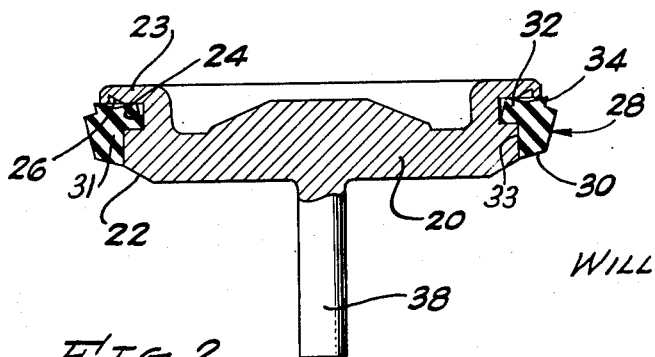

These and other objects and advantages of the present invention will become more apparent upon reference to the accompanying description and drawings in which:

FIGURE 1 is a vertical sectional view of the valve of the present invention; and FIGURE 2 is a sectional detail showing a portion of the valve body and flexible insert of the present invention prior to the insert being locked in place.

Referring now to the several figures, a valve seat 10 is supported in a cylindrical recess 12 of the pump housing by a copper friction bushing 14. The dimensions of the valve seat 10, recess 12 and bushing 14 are such that the bushing is slightly deformed when the seat and bushing are force-fit into the recess 12. An O-ring seal 16 of rubber or other suitable flexible material may be disposed in a groove formed on the periphery of the valve seat 10 to prevent any leakage around the periphery of the seat. The valve seat 10 is provided with a beveled upper edge 18 which serves as the seating surface for the valve.

A valve body 20 is adapted to rest on the valve seat 10 and is provided with a beveled rim 22 for cooperating with the seating surface 18 of the seat 10. The valve body 20 is also provided with a cap 23 in which is formed an annular groove 24. A second groove 26 is formed in the upper side wall of the groove 24 and is preferably triangular in cross section, with the base of a right triangle being perpendicular to the side of the groove 24 and farthest removed from its bottom surface and the hypotenuse of the triangle sloping away from the upper side surface of the groove 24.

The valve body is provided with a gasket or insert 28 constructed of a suitable flexible material such as rubber. The lower surface 30 of the flexible insert 28 is shaped so that it conforms to the shape of the seating surface 18 of the valve seat 10. The flexible insert 28 is molded or otherwise formed with a flange 32 for cooperation with the groove 24 in the valve body 20. The axially extending cylindrical portion 31 of the insert 28 below the flange 32 encircles the cylindrical wall 33 on the valve body. Molded on the upper surface of the flange 32 is a triangular ridge 34 having a shape which conforms to the triangular groove 26. The groove 26 and ridge 34 are located radially outward of the cylindrical wall. It should be understood that the groove 26 and ridge 34 could take other geometric configurations serving the same function as the triangular configuration illustrated.

In the assembling of the valve of the present invention, a suitable biasing spring 36 is mounted between the valve body 20 and the valve pot cover assembly to bias the valve body against the valve seat until a predetermined pressure differential is exceeded. The reciprocating movement of the valve body 20 is guided by a valve stem 38 which is preferably made integral with the valve body 20 and whose movement is guided by a suitable spider 40 which is preferably also mounted in the recess 12. The spider 40 is provided with a bushing 42 and ferrule 44 in the manner described in the aforementioned patent.

During the assemblage of the valve of the present invention, the flexible insert or gasket 28 is positioned around the outer periphery of the valve body 20 so that its flange portion 32 cooperates with the groove 24 of the valve body. This position is shown in FIGURE 2. Force is then exerted on the flexible insert 28 to force the ridge 34 to seat in the groove 26. Once this ridge is locked into the groove, the insert cannot be stripped from the valve by fluid action, regardless of the speed of closing or fluid velocity.

Having fully described my invention, it is to be understood that I am not to be limited to the details herein set forth, but that my invention is of the full scope of the appended claim.

I claim:

In a check valve, the combination comprising: a valve seat, said valve seat having an upper portion beveled to form a seating surface; a valve body adapted to rest on said valve seat, said valve body having a cylindrical wall and lower portion formed to cooperate with said seating surface; and an upper portion, said upper portion having a first groove formed in the periphery thereof and a second groove formed in the upper wall of said peripheral groove; and a flexible insert, said insert being coaxial with said valve body and having a portion encircling said cylindrical wall and lower portion formed to cooperate with said seating surface, and an upper portion, said upper portion having a flanged portion insertable in said peripheral groove and a ridge formed on the upper surface of said flanged portion insertable in said second groove, the groove and ridge being positioned radially outward of said cylindrical wall, whereby said insert is firmly engaged by said valve body when said flanged portion is inserted in said first groove and said ridge is inserted in said second groove.

References Cited by the Examiner
UNITED STATES PATENTS

| | | | |
|---|---|---|---|
| 1,424,094 | 7/22 | Gunn | 251—364 |
| 1,948,628 | 2/34 | Penick. | |
| 1,957,998 | 5/34 | Finefrock. | |
| 2,925,994 | 2/60 | Downs | 251—364 |
| 2,983,281 | 5/61 | Bynum | 137—543.23 |

FOREIGN PATENTS 283,225   3/31   Italy.

M. CARY NELSON, *Primary Examiner.*

MARTIN P. SCHWADRON, *Examiner.*